United States Patent [19]

Fukumura

[11] Patent Number: 5,355,476
[45] Date of Patent: Oct. 11, 1994

[54] FILE UPDATE APPARATUS FOR GENERATING A MATRIX REPRESENTING A SUBSET OF FILES AND THE UPDATE CORRESPONDENCE BETWEEN DIRECTORIES AND FILES

[75] Inventor: Masaaki Fukumura, Iruma, Japan

[73] Assignee: Casio Computer Co., Ltd., Tokyo, Japan

[21] Appl. No.: 801,005

[22] Filed: Dec. 2, 1991

[30] Foreign Application Priority Data

Dec. 29, 1990 [JP] Japan .................... 2-415947

[51] Int. Cl.$^5$ .................................... G06F 7/00
[52] U.S. Cl. .................... 395/600; 364/222.81; 364/222.9; 364/282.3; 364/DIG. 1; 395/161
[58] Field of Search ............... 395/600, 650, 700, 161; 364/419.17

[56] References Cited

U.S. PATENT DOCUMENTS

| | | | |
|---|---|---|---|
| 3,670,310 | 6/1972 | Bharwani | 395/600 |
| 3,822,378 | 7/1974 | Kashio | 364/779 |
| 4,003,031 | 1/1977 | Kashio | 395/600 |
| 4,031,515 | 6/1977 | Kashio | 341/87 |
| 4,032,900 | 6/1977 | Kashio | 395/250 |
| 4,034,350 | 7/1977 | Kashio | 395/200 |
| 4,064,553 | 12/1977 | Kashio | 395/425 |
| 4,079,234 | 3/1978 | Kashio . | |
| 4,103,334 | 7/1978 | Kashio . | |
| 4,133,041 | 1/1979 | Kashio . | |
| 4,145,753 | 3/1979 | Kashio . | |
| 4,321,672 | 3/1982 | Braun et al. . | |
| 4,360,872 | 11/1982 | Suzuki | 364/405 |
| 4,370,707 | 1/1983 | Phillips | 395/600 |
| 4,555,759 | 11/1985 | McCaskill | 364/419.17 |
| 4,633,397 | 12/1986 | Macco | 364/406 |
| 4,642,767 | 2/1987 | Lerner | 364/406 |
| 4,667,292 | 5/1987 | Mohlenbrock et al. . | |
| 4,730,252 | 3/1988 | Bradshaw | 364/403 |
| 4,780,821 | 10/1988 | Crossley | 395/650 |
| 4,809,170 | 2/1989 | Leblang et al. . | |
| 4,851,999 | 7/1989 | Moriyama . | |
| 4,852,000 | 7/1989 | Webb | 364/406 |
| 4,864,497 | 9/1989 | Lowry | 395/650 |
| 4,910,676 | 3/1990 | Alldredge | 364/408 |
| 4,914,569 | 4/1990 | Levine et al. . | |
| 4,918,593 | 4/1990 | Huber | 395/600 |
| 4,924,385 | 5/1990 | Dote . | |
| 4,939,689 | 7/1990 | Davis et al. . | |
| 4,949,258 | 8/1990 | Miyamoto . | |
| 4,967,348 | 10/1990 | Naito et al. . | |
| 4,975,835 | 12/1990 | Hidaka et al. . | |
| 4,991,087 | 2/1991 | Burnowski | 395/600 |
| 5,021,995 | 6/1991 | Quint | 395/600 |
| 5,079,695 | 1/1992 | Dysart | 395/700 |
| 5,097,408 | 3/1992 | Huber | 395/600 |
| 5,099,413 | 3/1992 | Sakai | 395/700 |
| 5,131,090 | 7/1992 | Fukushima | 395/700 |
| 5,202,984 | 3/1993 | Kashio | 395/600 |

FOREIGN PATENT DOCUMENTS

| | | |
|---|---|---|
| 53-46689 | 12/1978 | Japan . |
| 57-51137 | 10/1982 | Japan . |
| 57-56093 | 11/1982 | Japan . |
| 58-46735 | 10/1983 | Japan . |
| 58-53384 | 11/1983 | Japan . |

*Primary Examiner*—Thomas C. Lee
*Assistant Examiner*—Jennifer M. Orzech
*Attorney, Agent, or Firm*—Frishauf, Holtz, Goodman & Woodward

[57] ABSTRACT

In a file update processing apparatus incorporating files, a list having a matrix arrangement is automatically formed. In this list, files names are listed in one column in correspondence with the respective files, and directory names are listed in the other column in correspondence with directories. In addition, identification data indicating the correspondence between the directory names and the file names are included in the list, thereby clearly indicating specific files defined as update targets in units of directories. In addition, lists, each having a matrix arrangement, are automatically formed in units of arbitrarily designated files. In each list, field names of records constituting the designated file are listed in one column, and directory names including file update definitions for defining the designated file as an update target are listed in the other column. In addition, identification data indicating the correspondence between the directory names and the file names are included in the list, thereby clearly indicating specific fields defined as update targets in units of directories.

2 Claims, 9 Drawing Sheets

| FILE NAME | |
|---|---|
| UPDATE TYPE | |
| FIELD NAME OF FILE RECORD | FIELD NAME OF INPUT RECORD |
| 1 | |
| 2 | |
| 3 | |
| 4 | |
| ⋮ | ⋮ |
| n | |

FIG. 2

LIST INDICATING DIRECTORY NAME / FILE NAME CORRESPONDENCE

| DIRECTORY NAME \ FILE NAME | ACCOUNT TOTAL f | ITEM TOTAL f | INDIVIDUAL SALES TOTAL f | CUSTOMER TOTAL f | DETAILED LEDGER f | | FIXED ASSETS f |
|---|---|---|---|---|---|---|---|
| SALES SLIP | TOTAL | TOTAL | TOTAL | TOTAL | ADD | --- | --- |
| SHIPPING SLIP | | TOTAL | | | | | |
| ⋮ | | | | | | | |
| FIXED ASSETS REGISTRATION SLIP | | | | | | | ADD |
| ⋮ | | | | | | | |

FIG. 7

LIST INDICATING DIRECTORY NAME
/ FIELD NAME CORRESPONDENCE
(ACCOUNT TOTAL FILE)

| DIRECTORY NAME \ FIELD NAME | | OUR ACCOUNT | CUSTOMER ACCOUNT | YEAR/MONTH | DEBIT AMOUNT | CREDIT AMOUNT | BALANCE | |
|---|---|---|---|---|---|---|---|---|
| SALES SLIP | TOTAL | ○ | ○ | ○ | ○ | | ○ | |
| SALES SLIP | TOTAL | ○ | ○ | ○ | | ○ | ○ | |
| WHOLE SALE SLIP | TOTAL | ○ | ○ | ○ | ○ | | ○ | |
| WHOLE SALE SLIP | TOTAL | ○ | ○ | ○ | | ○ | ○ | |
| | | | | | | | | |

FIG. 8

INPUT RECORD

| a | b | c | d |
|---|---|---|---|
| xxx | ooo | △△ | xxx |

DIRECTORY P1

| FILE NAME | F1 | FILE NAME | F2 |
|---|---|---|---|
| UPDATE TYPE | ADD | UPDATE TYPE | ADD |
| FIELD NAME OF FILE RECORD | FIELD NAME OF INPUT RECORD | FIELD NAME OF INPUT RECORD | FIELD NAME OF INPUT RECORD |
| 1  A | a | X | c |
| 2  B | b | Y | d |
| 3  C |   | Z |   |
| 4  D | c |   |   |
| 5 |   |   |   |
| 6 |   |   |   |

UPDATE RECORD

↓ TOTAL/UPDATE

UPDATE RECORD

↓ ADD/UPDATE

F1    F2

FILE UPDATE APPARATUS FOR GENERATING A MATRIX REPRESENTING A SUBSET OF FILES AND THE UPDATE CORRESPONDENCE BETWEEN DIRECTORIES AND FILES

BACKGROUND OF THE INVENTION

1. Field of the Invention

The present invention relates to a file update processing apparatus such as a computer.

2. Description of the Related Art

In a file update processing apparatus such as a computer for storing/managing various types of files, e.g., sales files and inventory files, the contents of a file, of the stored files, designated as an update target, are generally updated on the basis of input data. In this case, files are updated in accordance with updating programs formed in advance by system design in correspondence with the respective files.

If, however, a large number of files are present, it takes much time and labor to design updating programs beforehand in correspondence with the respective files. For this reason, a file update processing apparatus capable of updating various types of files by referring to a directory which is arbitrarily set in advance has been developed and put into practice.

As shown in FIG. 9, in a file update processing apparatus of this type, a directory P1 set by system design or the like is stored in a storage unit. This directory P1 has a plurality of file update definitions. Each file update definition serves to define a file name of an update target and an update type ("add", "correct", "delete", or "total"). In addition, in each file update definition, the relationship between the field name of each record in the file and that of each input record is defined to change the form of each input record to the record form of an update file. The record form of each input record is changed to that of a corresponding file in accordance with a corresponding definition, thus forming an update record. Assume that a record consisting of fields a, b, c, and d is input. In this case, an update record corresponding to a file F1 and an update record corresponding to a file F2 are formed on the basis of two types of file update definitions set in the directory P1. The update record corresponding to the file F1 consists of fields A, B, C, and D. The contents of the records in the file F1 are totaled/updated on the basis of this update record. The update record corresponding to the file F2 consists of fields X, Y, and Z. Updating is performed to add a new record to the file F2 on the basis of this update record.

It is possible to confirm the contents of file update definitions in each directory by displaying them on a display screen or outputting them as a hard copy. However, the number of directories is increased, for example, as the number of types of files increases. If the number of file update definitions is increased accordingly, confirmation of definition contents requires very complicated and cumbersome operations.

SUMMARY OF THE INVENTION

The following is the first aspect of the present invention.

Assume that various types of file update definitions for defining file names as update targets and update methods therefor are stored in update definition storage means in units of directories. Before a list is formed, search means searches the update definition storage means for directory and file names corresponding to directories. List forming means forms a list having a matrix arrangement, in which the file names are listed in one column, and the directory names are listed in the other column. In addition, identification data indicating the correspondence between the directory names and the file names are included in the list, thereby clearly indicating specific files defined as update targets in units of directories.

The following is the second aspect of the present invention.

Assume that various types of file update definitions for defining the file names of update targets and the field names of update targets of records of the files are stored in update definition storage means in units of directories. Before a list is formed, search means searches the update definition storage means for directory and field names corresponding to the directories. List forming means forms lists, each having a matrix arrangement, in units of arbitrarily designated files. In each list, the field names of records constituting a designated file are listed in one column, and directory names including file update definitions for defining the designated file as an update target are listed in the other column. In addition, identification data indicating the correspondence between the directory names and the file names are stored in the list, thereby clearly indicating specific fields defined as update targets in units of directories.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 2 is a view showing the format of a file update definition;

FIG. 7 is a view of a list showing a directory name/file name correspondence;

FIG. 8 is a view of a list showing a directory name/field name correspondence.

DETAILED DESCRIPTION OF THE PREFERRED EMBODIMENT

An embodiment of the present invention will be described with reference to FIGS. 1 to 8.

Figure 1:
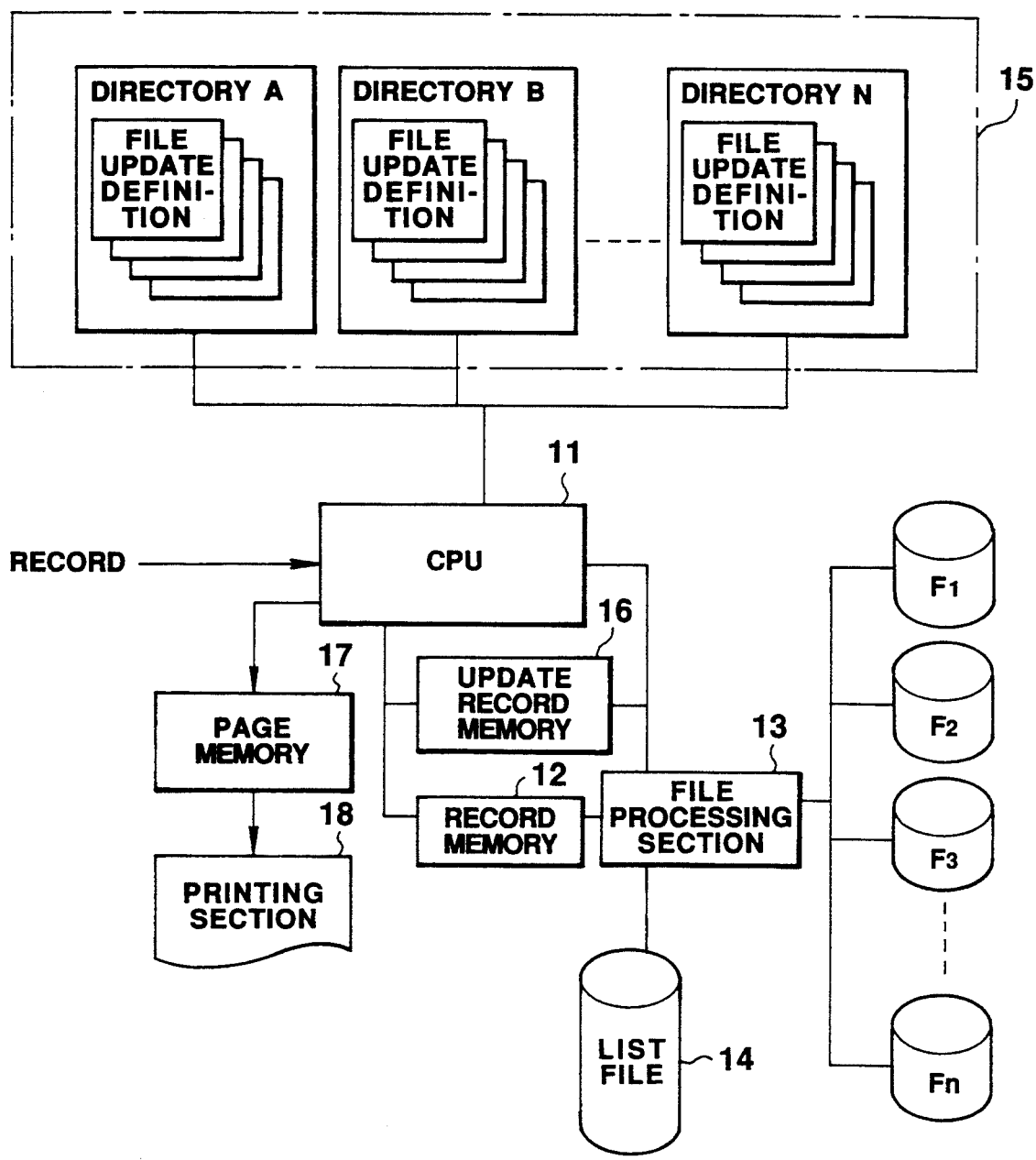
FIG. 1 is a block diagram showing the arrangement of a file update processing apparatus.

FIG. 1 is a block diagram showing the arrangement of a file update processing apparatus. In this file update processing apparatus, various types of files F1, F2, F3, ..., and Fn, which are stored/managed in advance, are set, and a plurality of directories A, B, ..., and N are set in accordance with the respective types of files F1 through Fn. In addition, a plurality of file update definitions are set in each directory. In the file update mode, a CPU 11 fetches an input record, and designates an update target file by referring to the directories set in a directory memory 15. The CPU 11 then forms an update record for updating the contents of the designated file on the basis of the input record, and writes it in an update record memory 16. A file processing section 13 updates the designated file on the basis of the contents of the update record memory 16. When file update definitions are to be set, or before a list (to be described later) is formed, the CPU 11 forms update definition records, each consisting of a directory name, an update target file name, an update definition, and the like, one by one in correspondence with file update definitions, and writes the records in a record memory 12. The contents of the record memory 12 are then added/stored in a list file 14 by the file processing section 13. The list file 14 is constituted by a plurality of update definition records. The respective records have one-to-one correspondence with the file update definitions. Furthermore, the CPU 11 refers to the list file 14 to form a list with a matrix arrangement on a page memory 17, and causes a printing section 18 to print the list.

FIG. 2 shows the format of a file update definition. As described above, each file definition has an area for defining a file name of an update target and an update type ("add", "correct", "delete", and "total"), and a field definition area for changing the form of an input record to the record form of a corresponding file. In this field definition area, the relationship between the field names contained in an input record and those, contained in a file record, corresponding to field Nos. "1", "2", ..., and "n" of the file record is defined. Note that the file record is a record in a file, and that the input record is a record to be input to a file. In the field definition area of a file update definition, the correspondence between each field of an input record and each field of a file record is defined.

An operation of this embodiment will be described next.

Figure 3:
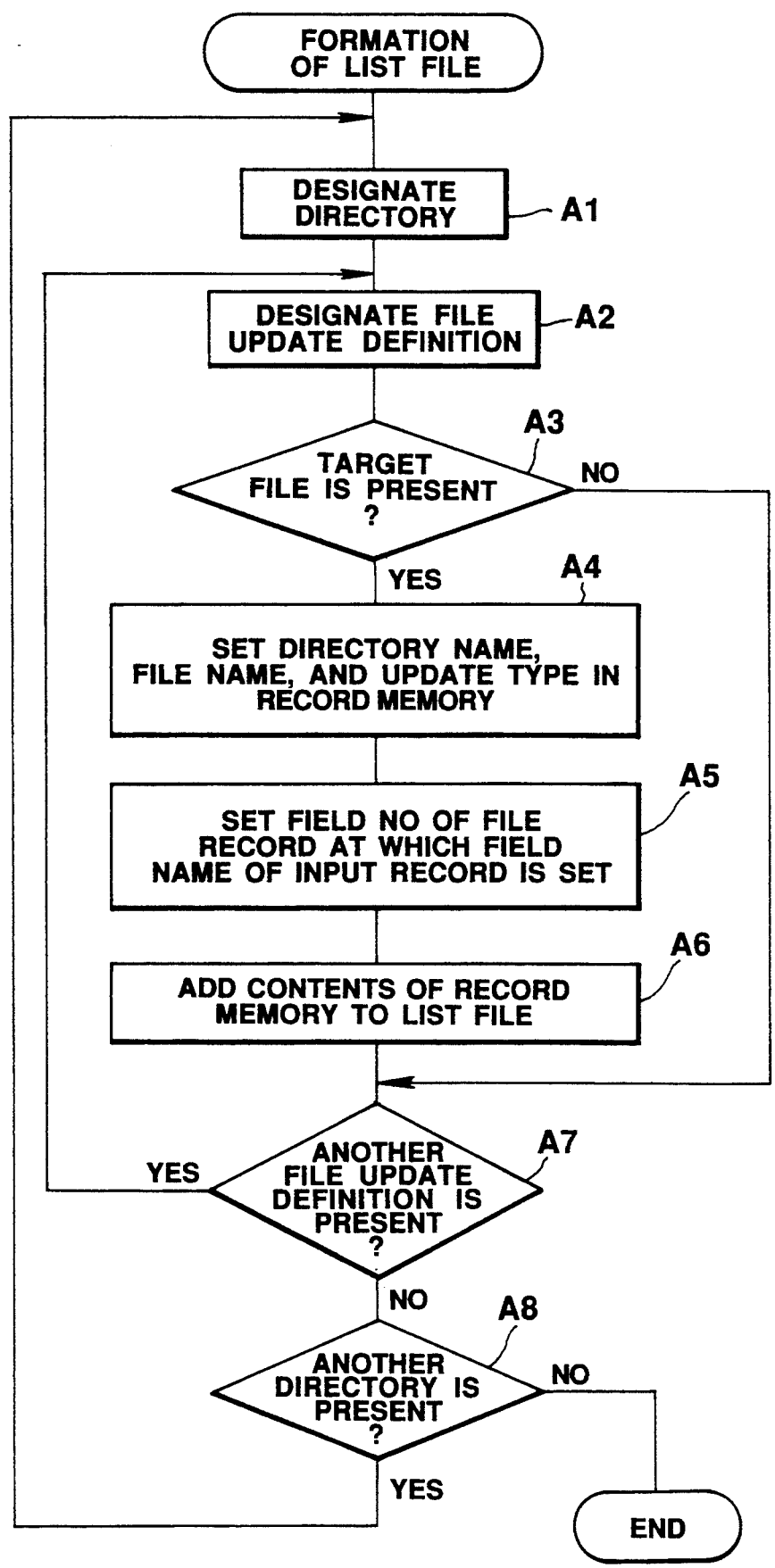
FIG. 3 is a flow chart showing the process of forming a list file 14.

FIG. 3 is a flow chart showing the process of forming the list file 14. When a command is entered to form a list after setting of directories is completed, the execution of the processing indicated by the flow chart in FIG. 3 is started. Assume that the directories A, B, ..., and N are set in the directory memory 15. In this case, the directory A is designated first (step A1), and the first file update definition contained in this directory A is designated (step A2). By referring to the file name defined by this file update definition, it is checked whether the target file is present in any of the files F1, F2, F3, ..., Fn of the system (step A3). If NO in step A3, the flow advances to step A7. If it is determined in step A7 that a next file update definition is present in the directory A, the flow returns to step A2 to designate the corresponding file update definition. It is then checked whether the target file is present (step A3). If YES in step A3, the directory name of the directory containing the file update definition is read out together with the file name and update type defined by the file update definition, and the read data are set in the record memory 12 (step A4). In addition, the field Nos., of the corresponding file record, at which the field names of the input record are set in the file update definition are sequentially written in the end portion of records in the record memory 12 (step A5). With this operation, update definition records having a record form shown in FIG. 4 are formed in the record memory 12, and are added/stored in the list file 14 (step A6).

Figure 4:
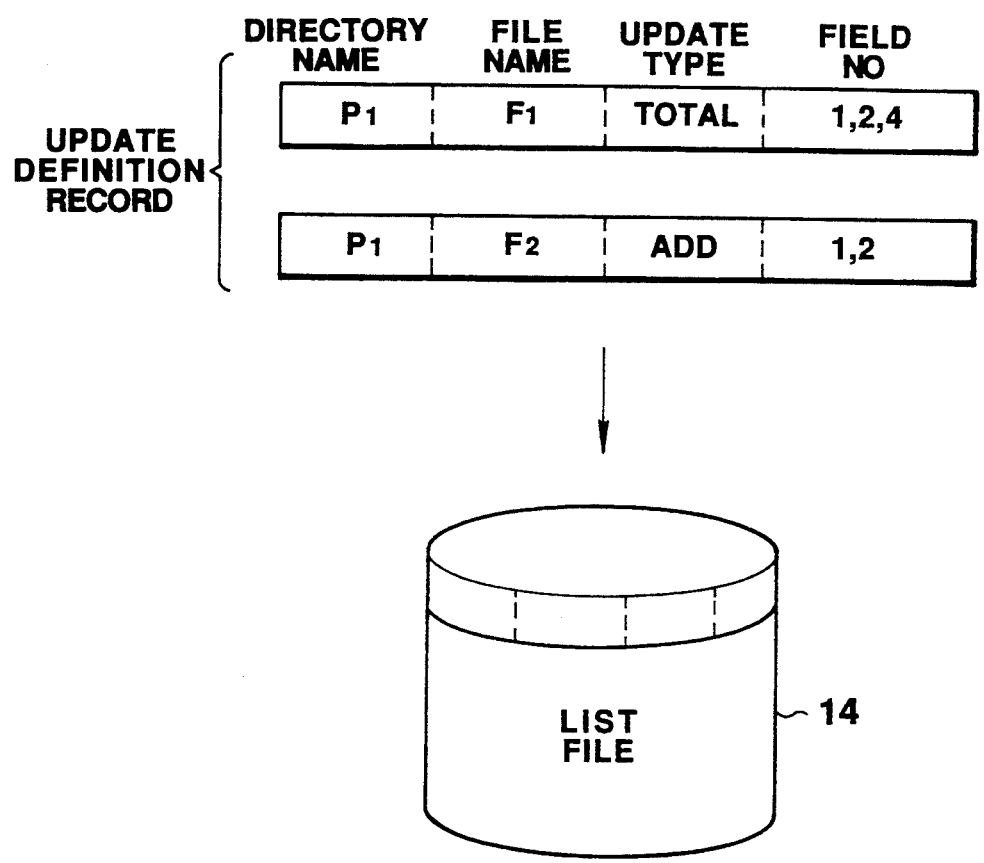
FIG. 4 is a view showing a detailed format of each update definition record to be added/stored in the list file 14.
Figure 9:
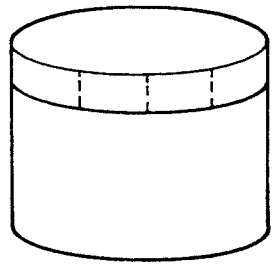
FIG. 9 is a view for explaining the operation principle of a conventional file update processing apparatus.
Figure 9:
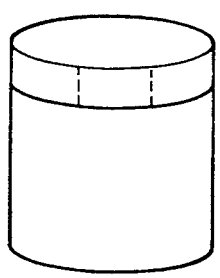

Note that FIG. 4 shows update definition records formed in accordance with the two types of file update definitions shown in FIG. 9. When the update definition records are added to the list file 14 in this manner, the flow advances to step A7 to check whether a next file update definition is present. If YES in step A7, the flow returns to step A2 again. The above-described operation is repeated until all the file update definitions in the directory A are designated. When the processing for the directory A is completed, the flow advances to step A8 to check whether a next directory is present. If YES in step A8, the flow returns to step A1. As a result, the directory B is designated, and update definition records are formed on the basis of the respective file definitions contained in the directory B. The update definition records are then added to the list file 14. Subsequently, a similar operation is repeated until processing for the last directory N is completed.

Figure 5:
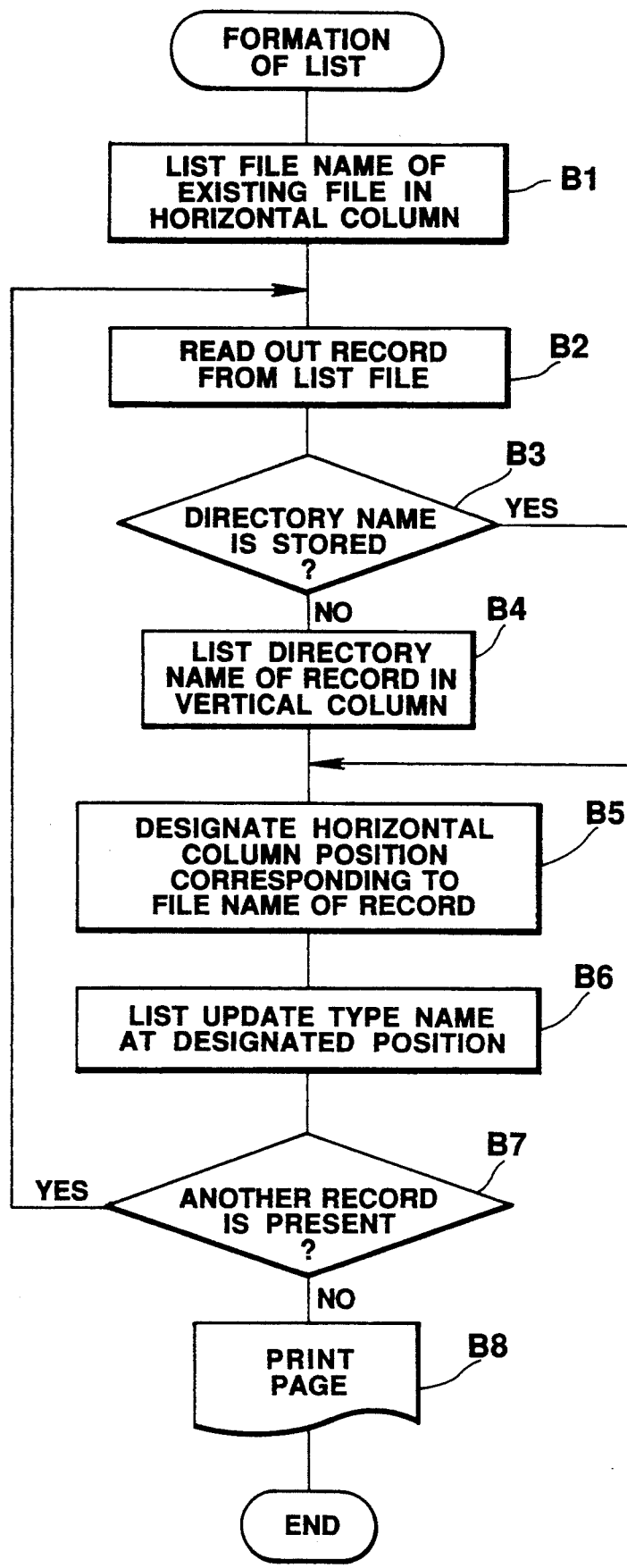
FIG. 5 is a flow chart showing the process of forming a list.
Figure 6:
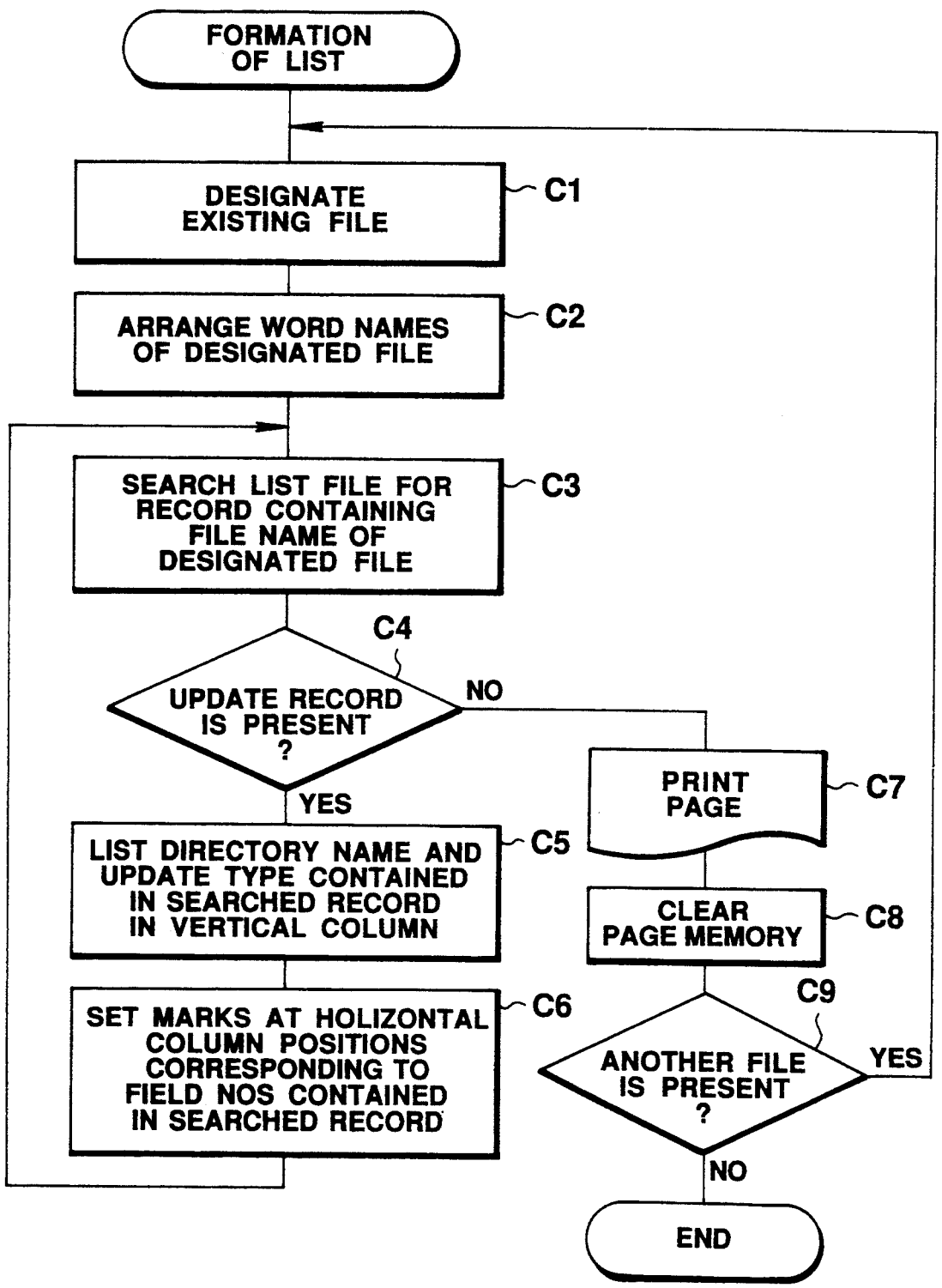
FIG. 6 is a flow chart showing the process of forming another type of list.

The process of forming a list indicating a directory name/file name correspondence shown in FIG. 7 will be described below with reference to a flow chart in FIG. 5. The file names of the respective files F1, F2, F3, ..., and Fn (an account total file, an item total file ...) In the system are listed in a horizontal column of the page memory 17 (step B1). One update definition record is read out from the start position of the list file 14 (step B2). It is then checked whether the directory name contained in the record has already been stored in the page memory 17 (step B3). If NO in step B3, the directory name (e.g., "sales slip") contained in the update definition record is set in a vertical column (step B4). A horizontal column position corresponding to the file name in the update definition record is designated in a horizontal column corresponding to this directory name (step B5), and the update type name in the update definition record is listed in this designated horizontal column position (step B6). Note that identification data other than an update type name may be stored.

The flow then advances to step B7 to check whether a next record is present in the list file 14. If YES in step B7, the flow returns to step B2 to read out the corresponding record from the list file 14. If the directory name contained in this update definition record has already been stored, only the corresponding update type name is stored. Subsequently, the above-described operation is repeated for each record until all the records are read out from the list file 14. If all the records are read out from the list file 14, the flow advances to step B8 to cause the printing section 18 to print the contents of the page memory 17. With this operation, the list indicating the directory name/field name correspondence shown in FIG. 8 is formed.

The process of forming a list indicating a directory name/field name correspondence shown in FIG. 8 will be described next with reference to a flow chart in FIG.

6. One of the files F1, F2, ..., and Fn in the system is designated first (step C1). FIG. 8 shows a case wherein the file F1 (account total file) is designated. The field names of records constituting the designated file are listed in a horizontal column of the page memory 17 (step C2). Subsequently, the list file 14 is searched for an update definition record containing the file name of the designated file (step C3). If the corresponding record is present (YES in step C4), the directory name and update type contained in the searched record are stored in a vertical column of the page memory 17 (step C5). In addition, marks (circles) are set at horizontal column positions corresponding to the field Nos. contained in the searched record (step C6). Thereafter, the flow returns to step C3, and the above-described operation is repeated. If it is determined in step C4 that the searched record is not present, the flow advances to step C7 to cause the printing section 18 to print the contents of the page memory 17. With this operation, the list indicating the directory name/field name correspondence in the account total file, as shown in FIG. 8, is formed and output. After the contents of the page memory 17 are cleared in step C8, the flow advances to step C9 to check whether another file is present. If YES in step C9, the flow returns to step C1 to designate the next file F2 (item total file), and a list forming operation is performed. Such a list forming operation is performed with respect to all the files.

In the above-described embodiment, update type names and marks (circles) are set at the intersections between the vertical and horizontal columns on a list having a matrix arrangement. However, the present invention is not limited to the above embodiment, and hence arbitrary data can be set at the respective intersections.

Additional advantages and modifications will readily occur to those skilled in the art. Therefore, the invention in its broader aspects is not limited to the specific details, and representative devices, shown and described herein. Accordingly, various modifications may be without departing from the spirit or scope of the general inventive concept as defined by the appended claims and their equivalents.

What is claimed is:

1. A file update processing apparatus for generating a list representing a file update designation state, the apparatus having file update definitions each defining a file name, an update type, and a correspondence between fields in an input record and fields in a file record, for converting the input record into the file record in accordance with the correspondence, and for performing an update of the type designated by the update type on the file record with respect to a file designated by the file name, the apparatus comprising:

directories storage means for storing a directory together with directory names, each directory including a plurality of file names and a combination of a plurality of the file update definitions representing some of said plurality of file names;

retrieval means connected to the directory storage means, for retrieving, in response to a list forming designation, directory names from each directory in the directory storage means and only file names from the file update definitions in each directory;

list forming means connected to the retrieval means for forming a list having a matrix arrangement, the retrieved file names being listed in one column of the list, the retrieved directory names being listed in another column of the list, and identification data indicating a correspondence between the retrieved directory names and the retrieved file names being included in the list wherein said identification data reflects the update type; and output means connected to the list forming means for outputting the list formed by said list forming means.

2. A file update processing apparatus for generating a list representing a file update designation state, the apparatus having file update definitions each defining a file name, an update type, and a correspondence between fields in an input record and fields in a file record by means of a field name, for converting the input record into the file record in accordance with the correspondence, and for performing an update of the type designated by the update type on the file record with respect to a file designated by the file name, the apparatus comprising:

directories storage means for storing a directory together with directory names, each directory including a plurality of file names and a plurality of the file update definitions representing some of said plurality of file names;

retrieval means connected to the directory storage means, for retrieving, in response to a list forming designation, directory names from each directory in the directory storage means and only field names from the file update definitions in each directory in units of file names;

list forming means connected to the retrieval means for forming, in units of file names, a list having a matrix arrangement, the retrieved field names being listed in one column of the list, the retrieved directory names being listed in another column of the list, and identification data indicating a correspondence between the retrieved directory names and the retrieved field names being included in the list wherein said identification data reflects the update type; and output means connected to the list forming means for outputting the list formed by said list forming means.

* * * * *